A. HECK.
WRAPPING MACHINE.
APPLICATION FILED FEB. 21, 1916.
1,239,597.
Patented Sept. 11, 1917.
6 SHEETS—SHEET 1.
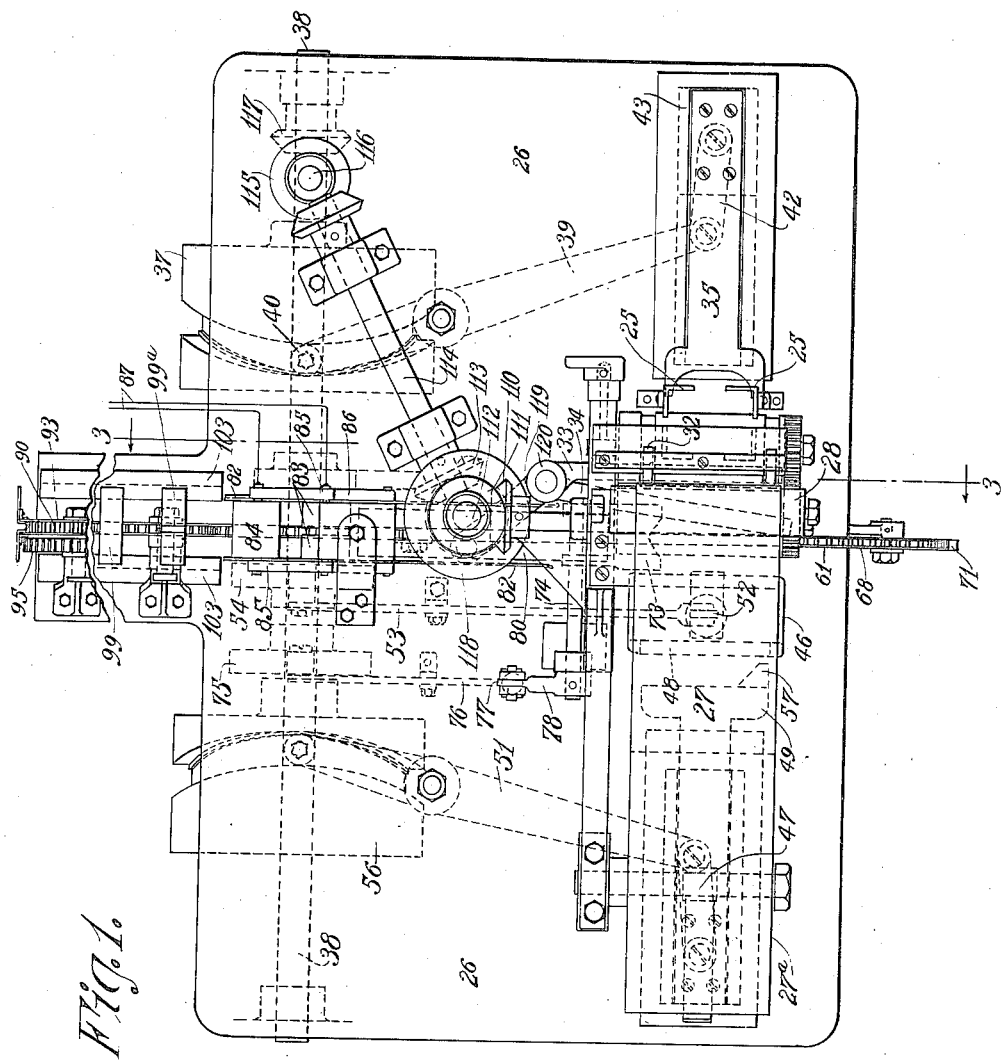
WITNESSES:
INVENTOR,
Augustus Heck,
BY
ATTORNEY.

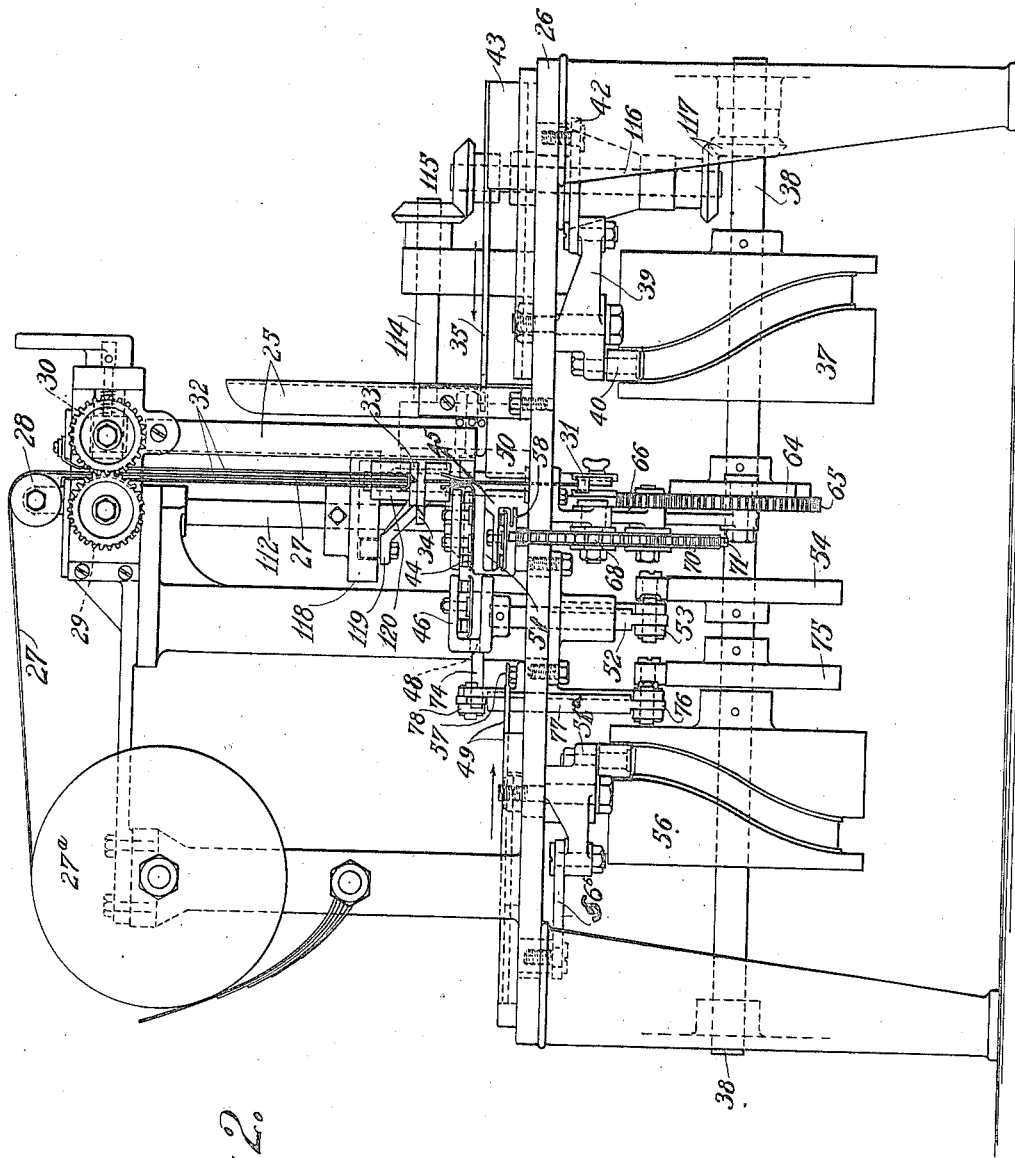

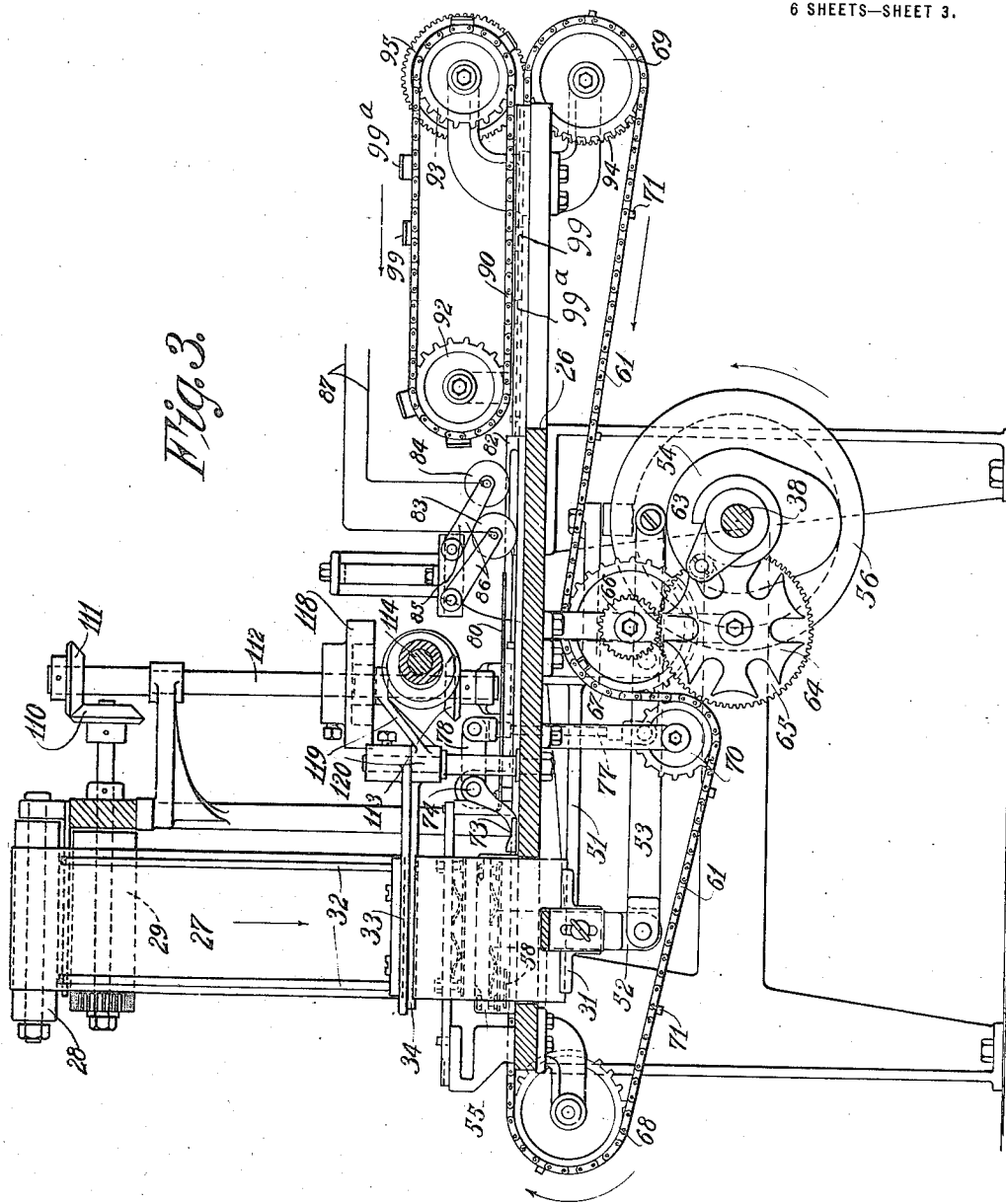

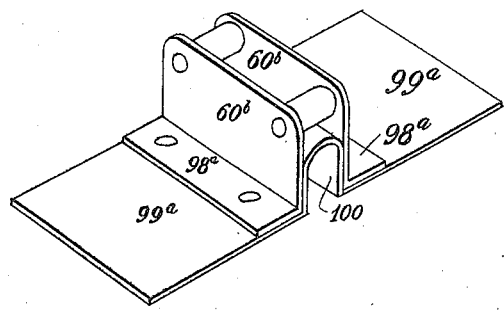
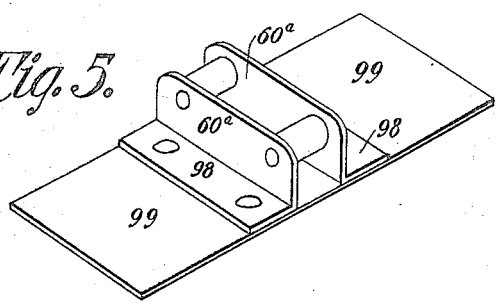
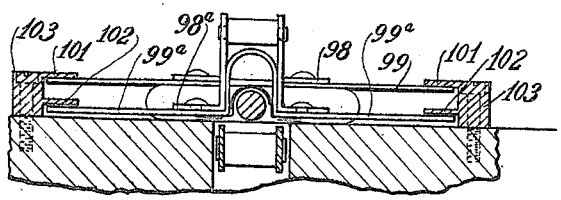
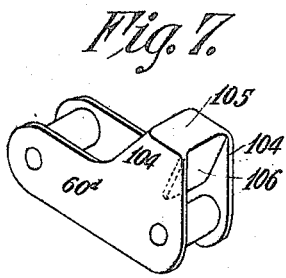
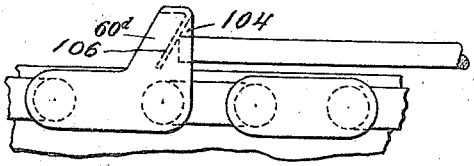
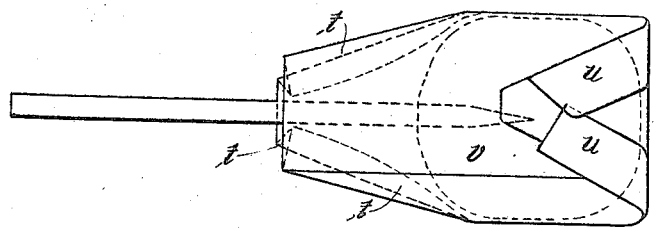

A. HECK.
WRAPPING MACHINE.
APPLICATION FILED FEB. 21, 1916.

1,239,597.

Patented Sept. 11, 1917.
6 SHEETS—SHEET 5.

WITNESS:
B. H. Seaver.

INVENTOR,
Augustus Heck,
BY
ATTORNEY.

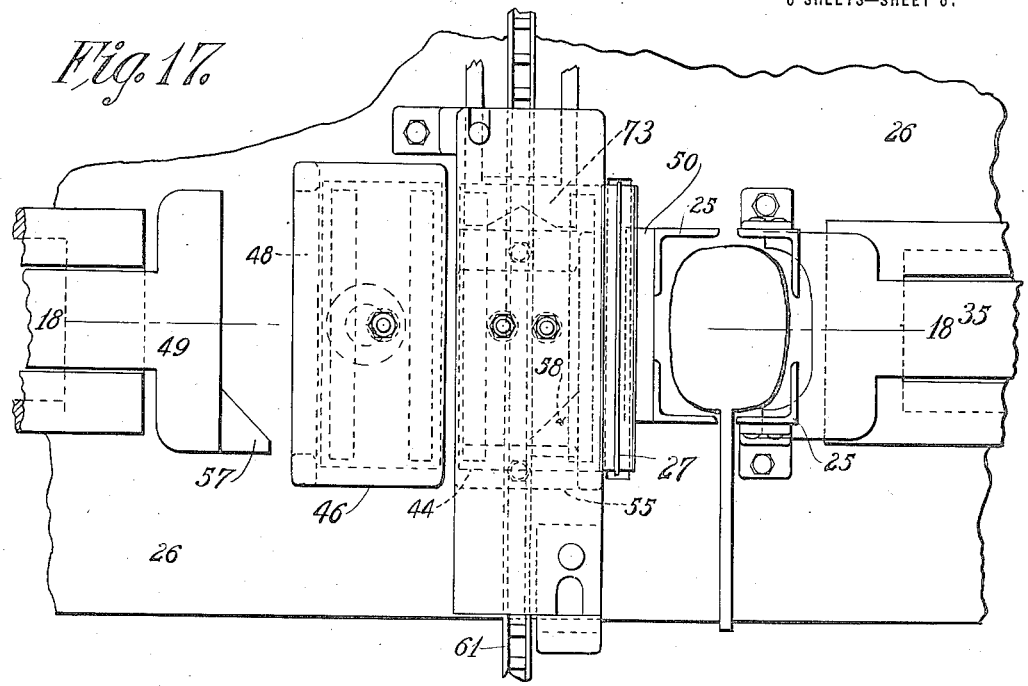
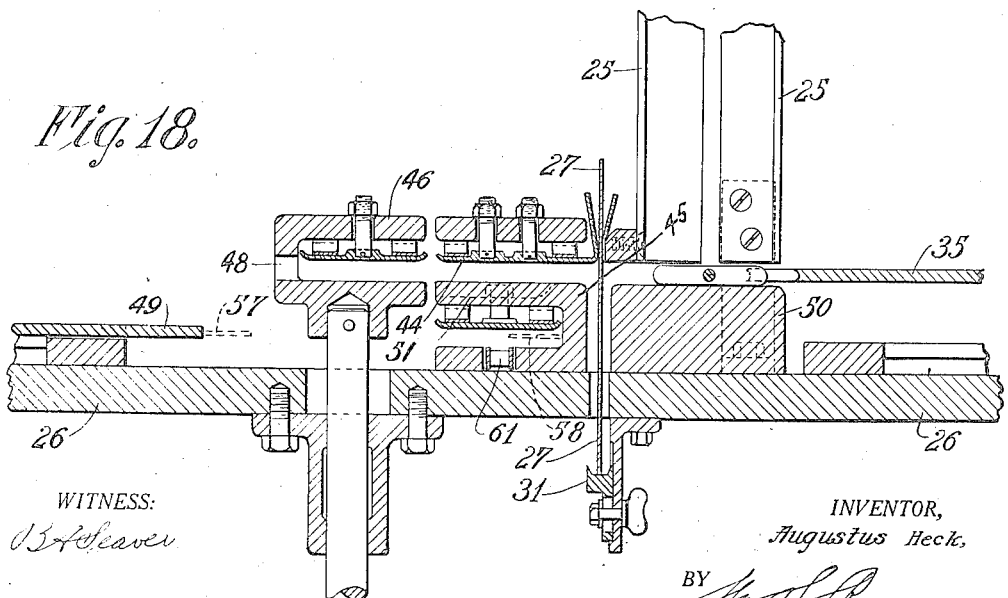

UNITED STATES PATENT OFFICE.

AUGUSTUS HECK, OF SPRINGFIELD, MASSACHUSETTS.

WRAPPING-MACHINE.

1,239,597.  Specification of Letters Patent.  Patented Sept. 11, 1917.

Application filed February 21, 1916. Serial No. 79,731.

*To all whom it may concern:*

Be it known that I, AUGUSTUS HECK, a citizen of the United States of America, and resident of Springfield, in the county of Hampden and State of Massachusetts, have invented certain new and useful Improvements in Wrapping-Machines, of which the following is a full, clear, and exact description.

This invention relates to a machine especially designed for the wrapping of candies popularly termed "lollypops" such being well known as consisting each of an elliptical or circular body of candy having rounded edges, and a stem by which to hold the candy while in, and while removed from, the mouth.

Certain portions or mechanisms comprised in the machine may, however, be utilized for the operations of wrapping pieces of other shapes than that of the particular article mentioned.

The invention is described in conjunction with the accompanying drawings showing its embodiment in a machine for wrapping lollypops and is set forth in the claims.

In the drawings:—

Figure 1 is a plan view of the present improved machine.

Fig. 2 is a front elevation of the same.

Fig. 3 is a sectional elevation transversely of the machine as seen beyond the plane indicated by line 3—3, Fig. 1.

Figs. 4 and 5 are perspective views showing different forms of equipments for one of the carrier chains comprised in the machine.

Fig. 6 is a cross sectional view showing the chain provided with the equipments represented in the two preceding figures, as in their running relations to the portion of the machine with which they coact.

Fig. 7 is a perspective view showing the form of one of the pusher members of the companion chain.

Fig. 8 is a side elevation of the chain including the part shown in Fig. 7.

Fig. 9 is a view showing the wrapped lollypop or piece.

Figs. 17 and 18 are respectively a plan view of the forward intermediate portion of the machine and a vertical section of the same taken on line 18—18, Fig. 17.

Figure 10:
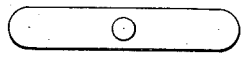
Figs. 10 to 16 are views for diagrammatically showing the succession of the operations for wrapping the piece.

In order, initially, to understand the operations performed by the machine, it will be first stated the lollypop, which will be hereinafter termed the "piece" has a location in a supply chute or stacking frame edgewise in relation to the supply sheet, suitably fed in a vertical plane, and cut off in proper size to constitute the wrapper in proximity to the piece, as represented in Fig. 10.

Figure 11:
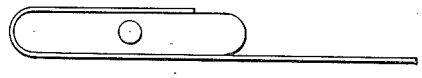

The piece is moved horizontally edgewise and bodily in a line at right angles to its stem to carry the wrapper with it, and subject to folding means, whereby the wrapper has a half fold around the piece, as represented in Fig. 11, a side portion of the wrapper horizontally extending beyond the unwrapped edge portion of the piece.

Figure 12:
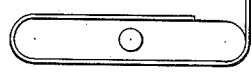

The piece and wrapper have next given thereto a bodily downward movement in relation to a fixed turning and folding member, whereby the free horizontal sidewise projecting portion of the wrapper is carried to a vertical relation as represented in Fig. 12.

Figure 13:
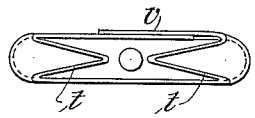
Figure 14:
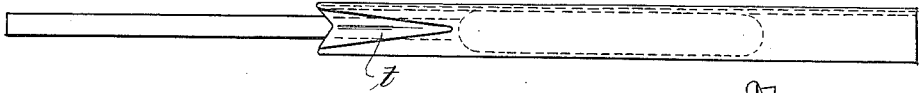

The partially folded piece has next imparted thereto a horizontal movement in a direction the reverse of the horizontal movement first imparted and subject to a fixed folding member, whereby the body of the piece is ensheathed by the wrapper as represented in Figs. 13 and 14, the wrapper at the end of the piece projecting in the form of a flattened tube, while the portion of the wrapper surrounding the stem of the piece is oppositely inwardly crimped and to appear similar to the flexible sides of a bellows, and is rearwardly convergent toward the stem.

Figure 15:
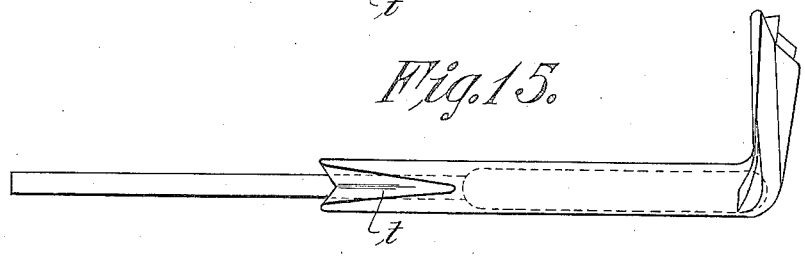

Before the next movement is imparted to the piece in a direction at right angles to those which had been thus far given thereto, a lifter is effective to turn up and convergently fold the projecting tubular portion of the wrapper as represented in Fig. 15.

Figure 16:
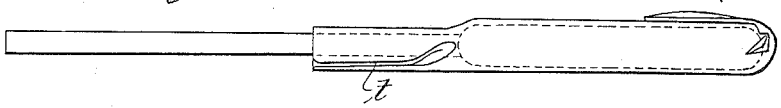

The piece thus far wrapped is moved horizontally under a stationary plate or folding member which is effective to turn down the upstanding folds onto the top of the body of the piece and to overlie, for part of the length of such body, the longitudinal folds of the opposite marginal portions of the sheet, as represented in Fig. 16.

The piece, by a carrier therefor, is next moved in the line of its stem under heated rollers which are effective to render the paraffin or wax with which the wrapper is treated adhesive and then in the further progress of the piece the portions of the wrapper which had been rendered adhesive by the heating are held together by members therefor for a length of time sufficient to permit the hardening and setting of the wax in the paper for the preservation of the closed condition of the wrapped piece.

In the drawings, 25 represents the stacking frame upstanding above the table-like top 26 of the machine frame and in which the bodies of the pieces are piled as indicated in Figs. 1 and 2.

27 represents the wrapper paper which is one treated with paraffin or wax and is intermittently drawn from the supply roll 27ª and guided around the pulley 28 between the feed rolls 29 and 30 to assume a depending position as shown in Fig. 1, its free end being led down near to a stop 31;
and for the guidance of the depending portion and to prevent the buckling thereof vertically spaced guide wires or strips 32 are provided.

The paper moved down to the stop 31 which is below the level of the lowermost piece at a point suitably above such level passes between shear members 33 and 34, the one 33 being stationary while the other is mounted for a swinging movement and has means for imparting the swinging movement thereto for the severing of a sufficiently advanced portion of the paper to constitute a wrapper for one of the pieces.

For the feeding of each lower one of the pieces in a pile horizontally in a line relatively to which the stem of the piece projects, toward and against an intermediate part of the severed and vertically disposed wrapper, the feed slide 35 is provided, the same having its forward edge formed with an arc shaped recess to partially embrace the approximately circular or elliptical body of the lollypop.

This feed slide is operated from a path cam 37 on the main shaft 38 of the machine (which shaft as understood is to be continuously driven by any suitable means, preferably by having a motor attached thereto or connected therewith). A lever 39 intermediately pivotally hung on a vertical axis has the roller 40 carried by one arm thereof engaged in a cam, while to the other arm thereof a link 42 is pivotally connected and also pivotally connected to a sliding base block 43 on which the feed slide 35 is mounted.

The throw or stroke of the feed slide is such as to move the piece and the wrapper between the separated folding members 44 and 55 whereby the wrapper assumes a position relatively to the body of the piece shown in Fig. 11, and is thence forced into a then stationary holder 46 therefor, which holder is capable of a descending and upwardly returning movement.

The said holder is made in the form of a rectangular block or body having a horizontal recess therein opening to one edge, and of a height to freely permit the entrance thereinto of the body of a piece and the partially surrounding wrapper; and at the front and rear this holder is also open and has, in fact, the appearance of a U-shaped jaw.

There is in its back or uniting portion 37 a comparatively wide recess 48 through which a second feed slide 49, to be hereinafter more fully referred to, may pass when the holder or jaw is moved down to a lower level.

When the piece and wrapper sheet are forced between the members 44 and 55 into the jaw shaped holder, the lower trailing portion of the sheet projects horizontally for a considerable distance beyond the unwrapped edge of the piece, and overlies member 55.

The jaw shaped holder 46 is mounted and guided for vertical movements so as to have its open edge pass downwardly in proximity to the stationary member 55, against which the downwardly carried wrapper impinges and by which such wrapper is thrown up to a vertical position, as represented in Fig. 12.

The holder 46 has a depending stem 52 to which an intermediately pivoted lever 53 is connected, and coacting with said lever is a cam 54 on the main shaft of the machine.

The cam periodically draws and temporarily maintains the holder down at a lower level corresponding to the level of the second named feed slide 49 so that such slide in its stroke to the rightward, as Figs. 1 and 2 are viewed, will carry the piece into a fixed receiver or jaw 51,—removing it from the holder jaw 46 into which the feed slide may enter through the aperture 48 in the back of such member.

The pusher slide 49 is at a level lower than that of the pusher slide 35 and in a plane to which the holder 46 is brought, is operated from the cam 56, the intermediately pivoted lever 56ª with which the cam coacts, and the link 56ᵇ connected to the feed slide.

The jaw or member 51 comprised in a block or stationary part 45,—which block forms part of the means for the forming of the first fold under the body of the piece, Fig. 11, and also part of the means for bringing the level unfolded part of the wrapper to the vertical position, Fig. 12,—
is made as an integrally formed U-shaped jaw opening to the leftward as Fig. 2 and Fig. 18 are viewed, so that when the piece is pushed from the depressed holder into the jaw 51, the upturned portion shown in Fig. 12 is folded to horizontal relation onto the top of the piece and to overlap the previously folded portion of the wrapper as shown in Fig. 13.

The feed slide 49 has a thin lip or crimping blade 57 at its side toward the front of the machine; and in substantially the line of movement of the lip 58 within the aperture of the jaw 51 is another thin lip 58 for imparting the crimpings at the opposite sides of the now sheath-like wrapper and at the portions thereof which protrude beyond the body of the piece in the direction of the stem as shown in Figs. 13 and 14.

Therefore, by forcing the piece in a direction transversely of the length of its stem by the feed slide 49 into the jaw 51, the double action of making the overlapping fold extend longitudinally of the piece and on the top thereof, and the crimping the tubular wrapper with bellows-like folds at the stem end, is performed.

The block in which the jaw 51 is comprised has a recess 60 through the base thereof, through which the upper course of the chain 61 passes, extending in a line from front to rear of the machine, and is at right angles to the lines of motion of the feed slides 42 and 49.

In the already described movements imparted to the piece the same has been bodily conveyed transversely of the length of its stem, while the movements it will henceforth have, as imparted by the carrier chain, are coincident with the length of the stem, the latter in such movements following the head of the piece.

Intermittent progressive movements are imparted to the carrier chain 61, the top course of which runs along near the level of the top or table 26 of the machine, by means as follows:

The Geneva drive comprising the roller carrying lever 63 in each revolution engages one of the radial recesses in the wheel 64 for turning such wheel one-sixth of a rotation. On the stud shaft on which this wheel is carried is a gear wheel 65 which meshes into a smaller gear wheel 66; and on the stud shaft on which the smaller gear wheel 66 is mounted is a sprocket wheel 67 partially around which the lower course of the chain runs. 68 and 69 are sprocket wheels at the front and rear of the machine having the upper portions of the rims thereof at the proper level, and here serve as supporting wheels for the chain; and 70 represents an idler and sprocket guiding and tensioning wheel for the chain.

The chain is provided at intervals in its length with abutments 71 for engaging the rear ends of the stems of the pieces for successively carrying them toward the rear of the machine out from the jaw or receiver 55.

While each piece having its stem projecting toward the front of the machine remains in the receiver jaw 51, and at such time having a portion of the length of the wrapper in the form of a flattened tube, as represented in Fig. 14, projecting beyond the body of the piece rearwardly and in the opposite direction from the stem, a device is operative to uplift, flatten and partially fold the flattened tube-like portion of the wrapper which projects in the rearward direction beyond the body of the piece to the condition represented in Fig. 15. Such device consists of a swinging or lever-like folder member 73 carried by a rockshaft 74 which is mounted somewhat above the top of the machine frame and ranges parallel with the front edge of such frame.

This lever-like folder member extends from the rockshaft 74 on which it is affixed in a downward and forward direction and has the foot piece thereof bifurcated for a contour represented in Figs. 1 and 17.

A rocking movement is periodically imparted to the rockshaft 74 (to impart the upward swinging movement and the downward return movement to the folder member 73) through means of a cam 75 coacting with a roller-provided lever 76 for the swinging of the latter, and a link 77 which is connected to short lever arm 78 on the rockshaft 74.

When the folder member has the upward swinging movement imparted thereto, the finger-like portions or bifurcations thereof engage the horizontally extending portion of the ensheathed wrapper which projects beyond the head of the piece, and in the moving of the same to the vertical position represented in Fig. 15, more or less converges the then upper and lower portions of the wrapper and cause the separate portions thereof to assume more or less convergent relations relatively to each other both as regards their longitudinal and their transverse dimensions.

The chain next carries the piece with the wrapper more or less as represented in Fig. 15 under a horizontally folding plate 80 whereby the upstanding portion of the wrapper is caused to be folded and laid down onto the top of the body of the piece, and to extend more or less nearly to or somewhat beyond the center of the latter, as represented in Figs. 16 and 9.

In the progression of the piece as carried by the chain from the front toward the rear of the machine, it moves between suitably spaced guide members 82 to constitute a shallow upwardly open channel therefor.

Slightly rearwardly beyond the horizontally folding plate 80 are rollers 83, 83 and 84 for bearing on the folded parts and causing the melting or softening of the wax incorporated in the wrapper.

The rollers 83, 83, are narrower than the one 84 and are carried in separation so as not to have contact against the stem of the piece in its trailing course rearwardly of the machine and so as to bear on the portions of the wrapper at the rear of the body of the piece, and said wrapper portions have the crimps or convergent bellows-like folds represented at $t$ $t$ in Fig. 9; and so that after the body of a piece has passed the rollers they will gravitatively descend for bearings on the fold forming parts $t$ $t$ for the compression thereof and the softening of the wax incorporated therein.

The roller 84 is of the full width of the body of the piece and is effective for compressing the portions $u$ $u$ which overlap one the other and which also overlap the longitudinal fold $v$, and also for compressing such longitudinal fold on the wrapper portion which it overlies (see Fig. 9); and it will be also apparent that one of the narrower rollers 83 operates to compress the longitudinal fold $v$ onto the bellows-like or crimped folds $t$ at one side of the stem.

The roller 84 is journaled at the end of a downwardly and rearwardly inclined pivoted yoke 85, and the separated pair of rollers 83 are journaled in a downwardly and rearwardly inclined pivoted yoke 86.

The said rollers 83, 83 and 84 are to be made of heavy metal, such, for instance, as brass, and are to be maintained at a suitably high degree of heat by electrical means of a character well known and forming no part of this invention; although in Fig. 3, current wires 87 are indicated as comprised in the electrical heating instrumentality.

In the further progression of each piece as carried by the upper course of the chain 61, it passes between such upper course of chain 61 and the lower course of the chain 90 which runs around sprocket wheels 92 and 93.

The aforementioned sprocket wheel for supporting the rear end of the chain 61 is driven by such chain; and this sprocket wheel has on the arbor thereof a gear wheel 94 which meshes with the gear wheel 95 on the arbor of the sprocket wheel 93 so that indirectly the means for driving the chain 61 is effective for the driving of the companion chain 90.

Links of the chain 90 which are at suitable distances apart have pairs of appliances of somewhat similar structural character but different as to relative location of bearing members thereof, for instance, as shown in Figs. 5 and 6, the chain link $60^a$ has side plates formed with angular and oppositely extended foot plates 98 to which is riveted a transversely extending resilient flat plate 99 such as clock spring steel to span the space between the opposite side links $60^a$ and to project outwardly in opposite directions considerably beyond the line of travel of the chain.

The side links $60^a$ are of comparatively slight vertical dimension so that the foot plate 99 is carried at a level corresponding to the plane of the top of the traveling piece.

The chain appliance next to the rear of the one just described and represented in Fig. 4 is of substantially similar construction, with, however, these differences:

The side links 60, $60^b$ thereof are of increased vertical dimension, and the resilient plate $99^a$ attached to the foot pieces $98^a$ of the side links is carried up in arched form at its portion 100 between the side links.

When the appliance represented in Fig. 5 is carried around to the lower course of the chain, the oppositely projecting extremities of the foot piece occupy positions in the lower plane different from that occupied by the foot plates 99 of the adjacent appliance.

The margins of the foot plates 99 and $99^a$ pass under flanges 101 and 102 in opposite longitudinally ranging bars 103, cross sectionally shown in Fig. 6, for preventing the rising thereof.

In the passage of the piece inclosed by the wrapper, the folded parts of which have been heated, such folded parts are subjected to retaining or pressure bearings in downward directions by the plates 99 and $99^a$, the one 99 pressing the folds which lie on the top of the piece, while the extremities of the plate $99^a$ engage the bellows-like folds at the rear of the body of the piece and at opposite sides of the shank portion of the stem.

Figs. 7 and 8 represent preferred detail constructions of the abutments 71 of the carrier chain, wherein the opposite side links $60^d$ provided at intervals are formed with upward extensions 104 with a transverse uniting member 105 formed with a lip or extension 106 which extends in a downward and rearward inclination so as to have the point of the abutment forming part 106 which bears against the rear end of the stem located between opposite cheeks or ears constituted by the forward part of the upward extensions 104, and which cheeks serve to prevent lateral swinging or displacement of the stem of the piece whereby the best action of the fold compressing parts is assured.

The appliance or part of the machine indicated at 44 under which the body of the piece and its wrapper are shoved by the first feed slide 35, to effect a folding of the wrapper to approximately U-shape, is made with an upwardly yielding or cushion plate for a manifestly advantageous effect or action on the articles being operated upon; and the jaw-like holder 46, and the jaw-like receiver 55,—the mouths of which are open one toward the other,—are likewise provided with yieldable plates for increasing the efficiency in the action or availability of these parts.

The means for the feeding of the paper from the supply roll 27ᵃ more or less horizontally from such roll and then downwardly through the vertical guides therefor, are through the pair of rollers 29, 30, one of which is peripherally reduced so that there will not be, in part of the time of their conjoint rotations, a nipping and feeding action on the paper; and the amount or length of the paper fed at each interval of the positive action of said rolls will be less or more, as required in different cases, according to the circumferential extent of the reduced face of one of the rolls.

The rolls may be geared together as usual in feed rolls, and one thereof is driven by having on its arbor a bevel gear 110 which meshes with a bevel gear 111 on an upright shaft 112, which shaft at a lower portion thereof is by gearing indicated at 113 in driven connection with a horizontal shaft 114, which in turn is driven through bevel gearing 115 by an upright shaft 116, which latter by the bevel gearing 117 is driven from the main shaft 38.

On the said shaft 112 is a cam 118 in the groove or path of which a lever arm 119 engages, which lever arm is formed as a radial extension of a hub 120 which is pivotally mounted for oscillatory movement on a vertical axis, and which carries, as another radial extension thereof, the swinging shear blade, hereinbefore referred to, which in conjunction with the stationary blade operates to sever, as required, so much of the lower extremity of the wrapper supply sheet as is desired for the wrapping of each piece operated upon by the machine as described.

I claim:—

1. In a wrapping machine, pluralized means for folding a wrapper around the body of a stem-provided piece, and in widely encircling relation about the portion of the stem adjacent such body, and means for forming opposite inwardly extending bellows-like folds to the stem encircling portion of the wrapper.

2. In a wrapping machine, pluralized means for folding a wrapper around the body of a stem-provided piece and in widely encircling relation about the portion of the stem adjacent such body, and for folding an end portion of the wrapper around the forward end of and onto the side of the piece, and means for forming inwardly extending bellows-like folds to the shank encircling portion of the wrapper.

3. In a wrapping machine, pluralized means for folding a wrapper around the body of a stem-provided piece and in widely encircling relation about the portion of the stem adjacent such body, means for forming inwardly extending bellows-like folds to the shank encircling portion of the wrapper, and means for compressing the bellows-like folds.

4. In a wrapping machine, pluralized means for folding a wrapper around the body of a stem-provided piece and in widely encircling relation about the portion of the stem adjacent such body, means for forming inwardly extending bellows-like folds to the shank encircling portion of the wrapper, and means for both compressing and heating the bellows-like folds.

5. In a wrapping machine, pluralized means for folding a wrapper around the body of a stem-provided piece and in widely encircling relation about the portion of the stem adjacent such body, means for forming inwardly extending bellows-like folds to the shank encircling portion of the wrapper, means for both compressing and heating the bellows-like folds, and further means for confining the said parts of the wrapper folds in adherent relations subsequent to the heating thereof.

6. In a wrapping machine, pluralized means for folding a wrapper so as to inclose the body of a stem-provided piece and to extend forward of the body, and also to have a disposition in widely encircling relation about the portion of the stem adjacent such body, and for folding an end portion of the wrapper around the forward end of and onto the side of the body, means for forming inwardly extending bellows-like folds to the shank encircling portion of the wrapper, means for heating and compressing the bellows-like folds of the wrapper and means for heating and compressing the portions of the wrapper which are in overlapped relations on the sides of the body.

7. In a wrapping machine, pluralized means for folding a wrapper so as to inclose the body of a stem-provided piece and to extend forward of the body, and also to have a disposition in widely encircling relation about the portion of the stem adjacent such body, and means for overturning the extended end portion of the wrapper around the forward end of and onto the side of the piece, means for forming inwardly extending bellows-like folds to the shank encircling portion of the wrapper, means for heating and compressing the bellows-like folds of the wrapper and means for heating and compressing the portions of the wrapper which are in overlapped relations on the sides of the body, and a conveyer chain for transferring the wrapped piece from the location of the bellows-like fold-forming means and the overturning means to the location of the heating and compressing means.

8. In a wrapping machine, a stacking frame for stem provided pieces, means for positioning a wrapper in position at one side of and at right angles to the body of one of the pieces, a pair of separated members beyond the stacking frame between and to a position beyond which the piece and wrapper may be forced to fold the wrapper around one edge and the opposite side of the piece, and means for moving the wrapper and piece between such members, means for moving the piece in a direction right angularly to one of said separated members whereby a portion of the wrapper at one side of, and extending beyond the edge of the piece may be turned to a right angular position and means for further folding such portion of the wrapper around onto the side of the piece.

9. In a wrapping machine, means for folding a wrapper which is longer than the piece so that it overlies the opposite sides and one edge of a stem-provided piece and has a portion thereof projecting beyond the other edge of the piece, and also projects forwardly beyond the body of the piece and oppositely projects in encircling relation to the portion of the stem adjacent the piece, a holder jaw,—into which the partially wrapped piece is received,—having an aperture in its back leading to the piece receiving opening therein, and means for moving such piece thereinto, a jaw shaped receiver at a different level from that of the holder jaw having the mouth thereof opening toward the mouth of holder jaw, and having a lip projecting from its back wall in a direction toward its mouth, means for moving the holder jaw relatively to the receiver jaw whereby said edgewise projecting portion of the wrapper is turned angularly across the edge of the piece, and whereby the mouth opening in the holder is brought to coincidence with the mouth opening in the receiver jaw, and a feed slide at the level of the receiver jaw opening adapted to edgewise engage the body of the piece and having a lip beyond its body engaging portion reciprocatingly movable through the aperture in the holder jaw, for transferring the partially wrapped piece from the holder jaw into the receiver whereby the angularly turned portion of the wrapper is folded onto the side of the piece, and whereby the said lips are effective to form bellows-like folds in the stem encircling portions of the wrapper.

10. In a wrapping machine, pluralized means for folding a wrapper so that it overlies the opposite sides and one edge of a stem provided piece, and also projects beyond the body for an encircling relation to the portion of the stem adjacent the piece, a holder jaw into which the partially wrapped piece is received, having an aperture in its back opposite its mouth, and also open at its sides right angularly to the mouth, a jaw-shaped receiver having the mouth thereof opening toward the mouth of the holder jaw and relatively to which the holder jaw may be brought for effecting an alinement of the jaw openings, a feed slide at the level of the receiver jaw opening, reciprocatingly movable through the aperture in the holder jaw, for transferring the partially wrapped piece from the holder jaw into the receiver, and lip members, one formed as a part of the receiver jaw and the other as part of the feed slide for imparting crimps or bellows-like folds to the ensheathing portion of the wrapper opposite to the stem.

11. In a machine for wrapping a stem provided piece, the combination with a U-shaped receiver jaw formed open at its sides which are right angular to its mouth, and having a lip projecting from the back wall thereof toward its mouth, of a feed slide, for moving the partially ensheathed piece into said receiver jaw, and formed with a lip opposite the lip in said jaw and which is operable to impart bellows-like folds to portions of a wrapper which are beyond the body of the piece and which widely encircle the stem at the portion of the latter adjacent the piece.

12. In a machine for wrapping a stem provided piece, the combination with a U-shaped receiver jaw formed open at its sides which are right angular to its mouth, and having a lip projecting from the back wall thereof toward its mouth, of a feed slide for moving a partially ensheathed piece into said receiver jaw and formed with a lip opposite the lip in said jaw and which is operable to impart bellows-like folds to portions of a wrapper which are in widely encircling relation to the stem, a swinging member adjacent one of the open sides of the receiver jaw, for upturning the tubularly formed portion of the wrapper which projects peyond the forward edge of the piece, consisting of a normally downwardly inclined bifurcated lever, a rock shaft by which the same is carried, having a lever projecting therefrom, a cam, and a lever, coacting with the cam, and a link connected with the rock-shaft lever.

13. In a machine for wrapping a stem provided piece, the combination with a U-shaped receiver jaw formed open at its sides which are right angular to its mouth, and having a lip projecting from the back wall thereof toward its mouth, and also having a passageway in its base along a line parallel with its mouth, of a feed slide for moving a partially ensheathed piece into said receiver jaw and formed with a lip opposite the lip in said jaw and which is operable to impart bellows-like folds to portions of a wrapper which are in widely encircling relation to the stem, a swinging member adjacent one of the open sides of the receiver jaw, for upturning the tubularly formed portion of the wrapper which projects beyond the forward edge of the piece, a conveyer chain movable through said passage way in the base of the receiver, and a horizontal member above and parallel with the chain, operable to fold the upturned portion of the wrapper onto the upper side of the body of the piece.

14. In a machine for wrapping a stem provided piece, the combination with a U-shaped receiver jaw formed open at its sides which are right angular to its mouth, and having a lip projecting from a back wall thereof toward its mouth, and also having a passageway in its base along a line parallel with its mouth, of a feed slide for moving a partially ensheathed piece into said receiver jaw and formed with a lip opposite the lip in said jaw and which is operable to impart bellows-like folds to portions of a wrapper which are in widely encircling relation to the stem, a wrapper upturning device adjacent one of the open sides of the receiver jaw, consisting of a normally downwardly inclined bifurcated lever, a shaft by which the same is carried, having a lever projecting therefrom, a cam, and a lever, coacting with the cam, and link connected with the rockshaft lever, an abutment provided conveyer chain, for carrying the piece, movable through said passage way in the base of the receiver, and a stationary horizontal member above and parallel with the chain and beyond said upturning device which is operable to fold the upturned portion of the wrapper onto the upper side of the body of the piece.

15. In a wrapping machine, means for folding a wrapper so that it overlies the opposite sides and one edge of a piece and has a portion thereof projecting beyond the other edge of the piece, a holder jaw into which the partially wrapped piece is received, and means for moving such piece thereinto, a stationary receiver jaw at a different level from the normal lever of the holder jaw having the mouth thereof opening toward the mouth of said holder jaw, and also open at its sides which are at right angles to its mouth, means for moving the holder jaw relatively to the receiver jaw whereby said projecting portion of the fold is turned angularly across the edge of the piece, means for transferring the partially wrapped piece from the holder jaw into the receiver whereby such angularly turned portion of the wrapper is folded onto the side of the piece, and a swinging folder member adjacent one of the open sides of the receiver jaw operable to turn a portion of the ensheathing wrapper which projects beyond the end of the piece to a right angular relation to the length of the latter, and means located beyond the receiver jaw for folding said angularly turned wrapper portion onto the side of the wrapper-inclosed piece.

16. In a machine for wrapping stem-provided pieces, in combination, a support for a stem provided piece, a horizontal feed slide at one side of and movable across such support, means for positioning a wrapper crosswise of the edge of the piece at the other side of said support, and horizontal separated members, between and beyond which the piece and sheet are moved by the feed slide, the lower one of said members being stationary and having the form of a horizontally apertured jaw, the mouth of which opens in a direction away from said feed slide, and provided therein with a thin crimp-forming lip extending from its side opposite its mouth toward the latter, a movable holder jaw having the mouth opening thereof toward the mouth of the first named jaw-like member, and located normally above said member, and into which the piece and wrapper are forced in the final movement of the feed slide, the edges of both said jaw-like members being contiguous to a common vertical plane, means for lowering the holder jaw to bring its jaw opening in alinement with the opening in the first named jaw, and for thereafter upwardly returning it, and a feed-slide located in a direction from the first feed slide beyond the holder jaw and at a level with the opening in the first named jaw, and provided with a thin crimp-forming lip, and operable to transfer the piece from the lowered holder jaw into the adjacent jaw, and by the provision of said lips to form bellows-like folds in the ensheathing portion of the wrapper at opposite sides of the stem of the piece.

17. In a machine for wrapping stem-provided pieces, in combination, a support for a stem provided piece, a horizontal feed slide at one side of such support, means for positioning a wrapper crosswise of the edge of the piece at the other side of said support, and horizontal separated members, between and beyond which the piece and sheet are moved by the feed slide, the lower one of said members being stationary and having the form of a horizontally apertured jaw, the mouth of which opens in a direction away from said feed slide, a movable holder jaw having the mouth opening thereof toward the mouth of the first named jaw-like member, and located normally above said member, and into which the piece and wrapper are forced in the final movement of the feed slide, the edges of both said jaw-like members being contiguous to a common vertical plane, means for lowering the holder jaw to bring its jaw opening in alinement with the opening in the first named jaw, and for thereafter upwardly returning it, a feed-slide located in a direction from the first feed slide beyond the holder jaw and at a level with the opening in the first named jaw, and operable to transfer the piece from the lowered holder jaw into the adjacent jaw, a device adjacent the stationary jaw for upwardly turning the portion of the ensheathing wrapper which projects beyond the body of the piece, a conveyer chain for the pieces movable in a line at right angles to the line of movements of the piece as imparted by the feed slides, and a horizontal member suitably above the chain, for folding an upturned portion of the wrapper onto the piece.

18. A wrapping machine comprising pluralized means for folding a wrapper about a stem provided piece, a conveyer chain for moving the piece, means for rendering folds of the wrapper adhesive, a companion chain having a course thereof running parallel with and spaced from the piece-carrying course of the first chain, and provided with plates closely under the chain links adapted to have a contact on the upper side of the wrapped piece and having separated laterally extended plates for bearing on folds of the wrapper at opposite sides of the stem of the piece.

19. In a wrapping machine, a conveyer for advancing a wrapped stem-provided piece, and a pair of separated yieldable heating members, under which the wrapped piece is moved, subject to pressure bearings thereon by said members, and to have the wrapper folds adjacent the body of the piece and at opposite sides of the stem rendered adhesive by said separated members.

20. In a wrapping machine, a conveyer for advancing a wrapped stem-provided piece, a yieldable heating member under which the piece is moved for rendering folded portions of the wrapper on the body of the piece adhesive, and a pair of separated yieldable members;—under which the body of the piece may have a crowding passage,—and operable to have pressure bearings on crimp-folded portions of the wrapper adjacent the body and at opposite sides of the stem of the piece.

21. In a machine for wrapping stem-provided pieces, means for folding a wrapper about the body of the piece and about a portion of the stem, a conveyer chain advancing the piece having abutments at intervals in the length thereof comprising upstanding opposite cheek members, and an intermediate stem engaging abutment member located to the rear of the forward edges of the cheek members and respective means for rendering folded portions of the wrapper adhesive and for holding such portions in contact relations while setting, to the action of which means the piece is carried by the abutment provided conveyer chain.

Signed by me at Springfield, Mass., in presence of two subscribing witnesses.

AUGUSTUS HECK.

Witnesses:
G. R. DRISCOLL,
WM. S. BELLOWS.